Feb. 14, 1933.  D. BAUTZ  1,897,832
TESTING GAUGE
Filed Dec. 14, 1929
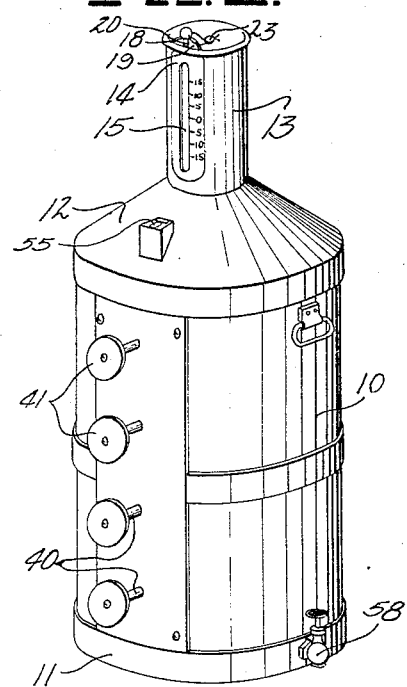
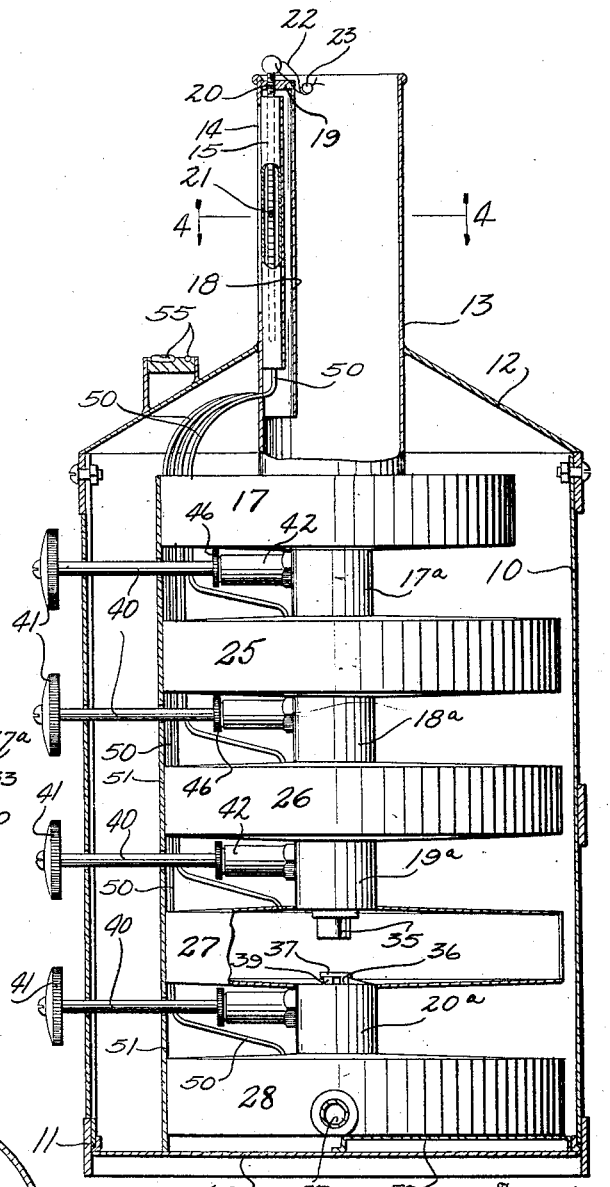
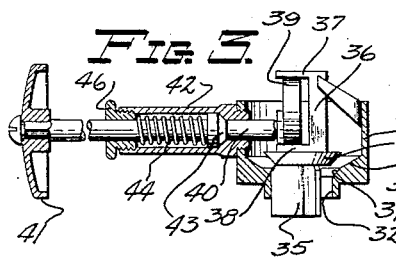
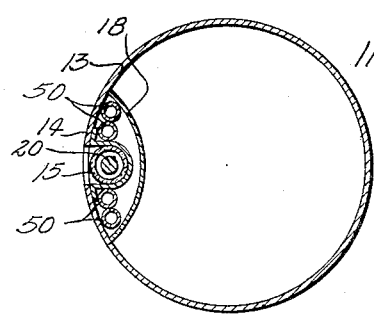
Inventor
Daniel Bautz
By Wheeler, Wheeler & Wheeler
Attorneys Patented Feb. 14, 1933

1,897,832

UNITED STATES PATENT OFFICE

DANIEL BAUTZ, OF MILWAUKEE, WISCONSIN, ASSIGNOR TO ANNA MUTSCH, OF MILWAUKEE, WISCONSIN

TESTING GAUGE

Application filed December 14, 1929. Serial No. 413,962.

My invention relates to improvements in testing gauges with particular reference to measuring gauges employed by city sealers to test the measuring receptacles in use by dealers.

The primary object of this invention is to provide means to facilitate testing operations.

Heretofore, it has been customary for sealers to take with them a set of testing receptacles of different capacities, usually ranging from one to five gallons in capacity. It is difficult to obtain sufficiently accurate results if a receptacle holding but one gallon is employed to test a five gallon receptacle. Slight or negligible inaccuracy in a single gallon is apt to be multiplied when measuring the contents of a large receptacle gallon by gallon and for this reason and the further reason that measurements gallon by gallon when testing the capacity of a large receptacle require considerable time and increase the testing expense, it has heretofore been thought necessary to use a plurality of receptacles involving a total investment in excess of $100.00 in order to do the work efficiently and accurately.

For the reasons above stated the object of this invention is to provide a single receptacle having a plurality of measuring chambers associated with means whereby any desired number of such chambers may be utilized for a given testing operation.

In the drawing:

Figure 1 is a perspective view of a testing receptacle embodying the invention herein disclosed.

Figure 2 is an elevation with the exterior wall and portions of the interior subdivisions broken away in vertical section.

Figure 3 is a detail sectional view of the valve mechanism.

Figure 4 is a sectional view drawn to line 4—4 of Figure 2.

Like parts are identified by the same reference characters throughout the several views.

A housing 10 preferably cylindrical in form and with an upright axis, is preferably provided with an annular base 11, a conically tapered cap 12 having at its apex a cylindrical upward extension 13 provided with a gauge plate 14, and a sight glass 15. The cylindrical extension 13 has its lower end projected through the cap and connected to an initial measuring container 17 with which it is in free communication.

The interior of the cylindrical member 13 is provided with a partition wall 18 having a top wall or flange 19 through which a screw 20 extends and is provided with a gauge pointer 21 in a position of exposure to view through the sight glass 15. This pointer 21 is officially adjusted at a point indicative of one unit of measurement, such as a gallon of liquid when contained within the chamber 17 and the cylindrical extension 13 to the level at which the pointer 21 is adjusted.

When the adjustment of the pointer 21 has been officially made, tested, and found to accurately indicate that exactly one gallon of liquid is within the chambers 17 and 13 when the level of the pointer is reached by the liquid, the screw 20 is then secured by a seal of any suitable type such as the wire seal 22 which is passed through a hole in the head of the screw and secured in cast metal at 23.

Below the container 17, a series of similar containers 25, 26, 27, and 28 are provided and connected with each other by tubular passages 17a, 18a, 19a, and 20a respectively. Each of these connecting passages is provided with a valve whereby the liquid in any one of the containers may be delivered to the next when the valve is open, the containers being arranged in a vertical series as shown.

The valves are alike. Figure 3 illustrates the valve employed in the connecting duct 17a. This duct is provided with a tapering bottom portion 30 provided with a valve seat at 31 and a tubular outlet port at 32. The check valve 33 has a bevelled face which fits the seat and it also has a flanged guide 35 which extends downwardly in the outlet port 32. The top of the valve is provided with a bracket 36 having upper and lower flange plates 37 and 38 between which a cam or eccentrically mounted disk 39 is located. This disk is connected at one side of its center with an operating rod or shaft 40 which extends to the exterior of the housing 10 and is provided with a suitable knob or handle 41.

To prevent leakage along the valve operating rod 40, the tubular connection 17a is provided with a packing cylinder 42 and the rod has a conically tapered packing flange 43 which is urged to a seat at the inner end of the packing cylinder 42 by a spring 44, the outer end of the spring seating against the nut 46.

The containers 25, 26, 27 and 28 are exactly alike and each, with those portions of its associated tubular connections with the other containers above the valve 33 below it and below the valve 33 above it, is made to hold exactly one gallon of liquid or one unit of measurement if a unit other than a gallon is adopted as the standard. In stating that these containers are exactly alike, I am referring to the structure shown in the drawing. These containers may, of course, represent different units of measurement if desired.

The top of each of these containers is slightly conical in form and a vent pipe 50 leads from the central portion of the top upwardly along a supporting wall 51 and into that portion of the cylindrical extension 13 which is partially enclosed by the partition wall 18, these vent pipes being preferably grouped on either or both sides of the screw 20. The supporting wall 51 also serves as a support for the valve operating rods or stems 40.

A two-way leveling gauge 55 of ordinary type is preferably mounted on the top 12 of the housing 10. During testing operations, the housing 10 is first adjusted with its axis in a vertical position as indicated by a leveling gauge or gauges. Thereupon, if a receptacle intended to contain one gallon is to be tested for the accuracy of its measurement, such receptacle will be filled and after closing the valve 33 in the tubular passage 17a, the contents of the receptacle to be tested will be poured into the top of the cylindrical member 13. If the liquid rises to the pointer 21, an exact gallon measurement will be indicated. If it fails to rise to that level, short measurement will be indicated, and if it rises above that level, excess measurement will be indicated.

Assuming that a two gallon receptacle is to be tested, the operation will be the same as above described with the exception that instead of closing the valve in the passage 17a, the valve in the passage 18a will be closed, whereupon, it will take exactly two gallons of liquid to fill the two containers 17 and 25, and the receiving cylinder 13 to the level of the pointer 21.

For each additional gallon in the assumed capacity of the receptacle to be tested, additional containers will be brought into use by opening all the valves above and closing the valve immediately below the lowest container representing the number of gallons to be received.

It will also be obvious that a plurality of receptacles may be tested in one operation if their combined capacity does not exceed the capacity of the containers carried by the housing 10. For example, assuming that a one gallon receptacle and a three gallon receptacle are to be tested successively, it will be possible to first test the one gallon receptacle by closing the valve in the passage 17a and after the liquid has been poured into the tester and the capacity of the receptacle thus ascertained, the valve in the passage 17a may then be opened to allow the liquid to pass into the container 28, after which the valve in the passage 19a may be closed and the contents of the three gallon receptacle poured into the gauge.

After testing any given quantity of liquid, all of the containers may be drained through a suitable outlet passage 57 having a manually operable exterior valve shown at 58 in Figure 1. It is not necessary that this drain spout or outlet 57 should extend from the bottom of the container 28, although this container 28 is preferably mounted on a shelf 59 to protect it from any distortion or indentation that might result if the bottom 60 of the housing 10 should be damaged. If the drainage pipe 57 is located above the bottom of the container 28, the contents of said container may be wholly discharged by tipping the housing 10 in the direction of the outlet or lifting and turning it to a horizontal position with the outlet at the under side.

It will be understood that the purpose of the tubular communicating passages between the containers is to facilitate the use of reliable valve mechanism which can be operated from the exterior of the housing. The form, structure and arrangement of the communicating passages and of the valve mechanism is not essential except as to the requirement that the valves be adequate to prevent leakage and capable of adjustment to the open and closed positions. Also, the containers are preferably spaced from the housing in order that injury or distortion of the container will not result from displacement of any portion of the housing wall.

The tubular vents are preferably employed to avoid the violent ebullition of the liquid which would otherwise be caused if the containers were allowed to vent only through their connecting passages. The receiving tube is provided with separate vent tubes through which air may escape separately from each container until the latter has been almost completely filled whereby the liquid may flow freely into each container without violent agitation and without being obstructed in its flow by rising air bubbles.

I claim:

1. A testing gauge comprising the combination of a set of superposed communicating containers, each of predetermined individual capacity, means for shutting off communication between any two of the respective containers, an extension associated with the upper container and provided with a filling passage, and an indicator within said passage provided with visible means for indicating the level of the liquid in said passage, whereby to indicate the total quantity of liquid in the upper chamber and any given number of other containers then in communication with the upper chamber.

2. A portable testing gauge comprising the combination with a suitable housing, of a series of superposed chambers within the housing, each having valved communication with the next in the series, means for operating the valves from a point exterior to the housing, the upper chamber in said series being provided with an extension through the top of the housing, said upper chamber and a portion of the extension having a combined capacity equal to the individual capacity of each other chamber in the series, vent pipes extending from each of said other chambers upwardly into said extension, and an indicator in said extension provided with a visible gauging means for indicating the level of the liquid in the upper chamber, said chambers each having a predetermined capacity, whereby said gauge may accurately indicate the total quantity of liquid in any number of those in communication with each other above a closed valve.

3. A testing gauge comprising the combination with a suitable housing, of a series of superposed chambers of equal capacities within the housing, each having an independent vent pipe extending through the top portion of the housing, and each being also provided with a tubular connection with the next in the series, valves controlling the flow of liquid through said tubular connections and provided with valve actuating devices extending through the housing wall, a receiving chamber located above the other chamber and having an upward extension provided with a gauge adapted to indicate the level of liquid in the extension, and to also indicate the total quantity within the receiving chamber and its extension, and connections for supplying one of the other chambers from the receiving chamber, and a valved outlet duct leading from the bottom chamber to the exterior of the housing.

4. In a portable testing gauge of the described class, the combination with a suitable housing, of a series of independently vented superposed measuring chambers within the housing, spaced from each other and from the outer wall thereof, an interior support connected with the measuring chambers at points distant from the outer walls, and adapted to hold the chambers in such spaced relation, said housing having a filling tube extending through its top wall and communicating with the upper measuring chamber, and said measuring chambers having valved connection with each other and valve actuating devices operable from the exterior of the housing.

DANIEL BAUTZ.